United States Patent
Feinstein et al.

(10) Patent No.: US 9,360,498 B2
(45) Date of Patent: Jun. 7, 2016

(54) METHOD FOR AUTOMATICALLY LOADING A PROBE ASSEMBLY

(75) Inventors: Adam J. Feinstein, Santa Barbara, CA (US); Matthew R. Wilson, Santa Barbara, CA (US); Timothy M. Cunningham, Santa Barbara, CA (US)

(73) Assignee: Bruker Nano, Inc., Santa Barbara, CA (US)

(*) Notice: Subject to any disclaimer, the term of this patent is extended or adjusted under 35 U.S.C. 154(b) by 899 days.

(21) Appl. No.: 13/069,182

(22) Filed: Mar. 22, 2011

(65) Prior Publication Data
US 2011/0173729 A1    Jul. 14, 2011

Related U.S. Application Data

(60) Division of application No. 12/058,996, filed on Mar. 31, 2008, now Pat. No. 7,908,909, which is a continuation of application No. 11/426,461, filed on Jun. 26, 2006, now abandoned.

(51) Int. Cl.
*G01Q 70/02* (2010.01)
*G01Q 70/06* (2010.01)
*B82Y 35/00* (2011.01)

(52) U.S. Cl.
CPC ............... *G01Q 70/06* (2013.01); *B82Y 35/00* (2013.01)

(58) Field of Classification Search
None
See application file for complete search history.

(56) References Cited

U.S. PATENT DOCUMENTS 5,705,814 A * 1/1998 Young et al. ............. 850/2

\* cited by examiner

*Primary Examiner* — Robert R Raevis
(74) *Attorney, Agent, or Firm* — Boyle Fredrickson, S.C.

(57) ABSTRACT

The preferred embodiments are directed to a method of operating an SPM including providing probe cassette for a scanning probe microscope that includes a base having at least one probe storage receptacle, a lid mountable on the base with the probe storage receptacle at least substantially covering the at least one receptacle, and a probe retainer that retains a probe device of the scanning probe microscope in the receptacle under a compressive force. The probe cassette can be preloaded and shipped to a user site where the cassette can be loaded in an AFM without manual manipulation of the individual probe devices.

15 Claims, 6 Drawing Sheets

METHOD FOR AUTOMATICALLY LOADING A PROBE ASSEMBLY

CROSS REFERENCE TO RELATED APPLICATION

This application is a divisional application of U.S. Ser. No. 12/058,996, filed Mar. 31, 2008, now U.S. Pat. No. 7,908,909, issued Mar. 22, 2011, entitled Apparatus and Method of Transporting and Loading Probe Devices of a Metrology Instrument, which is a continuation of U.S. Ser. No. 11/426,461, filed Jun., 26, 2006, and entitled Apparatus and Method of Transporting and Loading Probe Devices of a Metrology Instrument, the entireties of which is expressly incorporated by reference herein.

BACKGROUND OF THE INVENTION

1. Field of the Invention

The preferred embodiments are directed to an apparatus for storing and delivering probe devices for a scanning probe microscope (SPM), and more particularly, a probe cassette for an SPM that is adapted to readily interface with an SPM and includes one or more probe retainers to hold the probe devices under a compressive force without the probe devices sticking thereto.

2. Description of Related Art

Several probe-based instruments monitor the interaction between a cantilever-based probe device and a sample to obtain information concerning one or more characteristics of the sample. The probe devices used by these instruments are typically very expensive to fabricate, and each often costing a thousand dollars or more. They also are quite delicate. As such, great care must be used when handling them, both after fabrication and in preparation for use, as well as when considering shipment, including packaging, and on-site transport options. Prior systems have proven inadequate.

A brief review of these instruments will highlight the challenges associated with maintaining a high yield of usable probes after production. Scanning probe microscopes (SPMs), such as the atomic force microscope (AFM), are instruments which typically use a sharp tip to make a local measurement of one or more properties of a sample. More particularly, SPMs typically characterize the surfaces of such small-scale sample features by monitoring the interaction between the sample and the tip of the associated probe device. By providing relative scanning movement between the tip and the sample, surface characteristic data and other sample-dependent data can be acquired over a particular region of the sample, and a corresponding map of the sample can be generated.

The AFM is a very popular type of SPM. The probe of the typical AFM includes a very small cantilever which is fixed to a support at its base and has a sharp probe tip attached to the opposite, free end. The probe tip is brought very near to or into direct or intermittent contact with a surface of the sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as an arrangement of strain gauges, capacitance sensors, etc. AFMs can obtain resolution down to the atomic level on a wide variety of insulating or conductive surfaces in air, liquid or vacuum by using piezoelectric scanners, optical lever deflection detectors, and very small cantilevers. Because of their resolution and versatility, AFMs are important measurement devices in many diverse fields ranging from semiconductor manufacturing to biological research.

In operation, the probe is most often scanned over a surface using a high-resolution three axis scanner acting on the sample support and/or the probe. The instrument is thus capable of creating relative motion between the probe and the sample while measuring the topography or some other property of the sample as described, for example, in Hansma et al. supra; Elings et al. U.S. Pat. No. 5,266,801; and Elings et al. U.S. Pat. No. 5,412,980.

Figure 1:
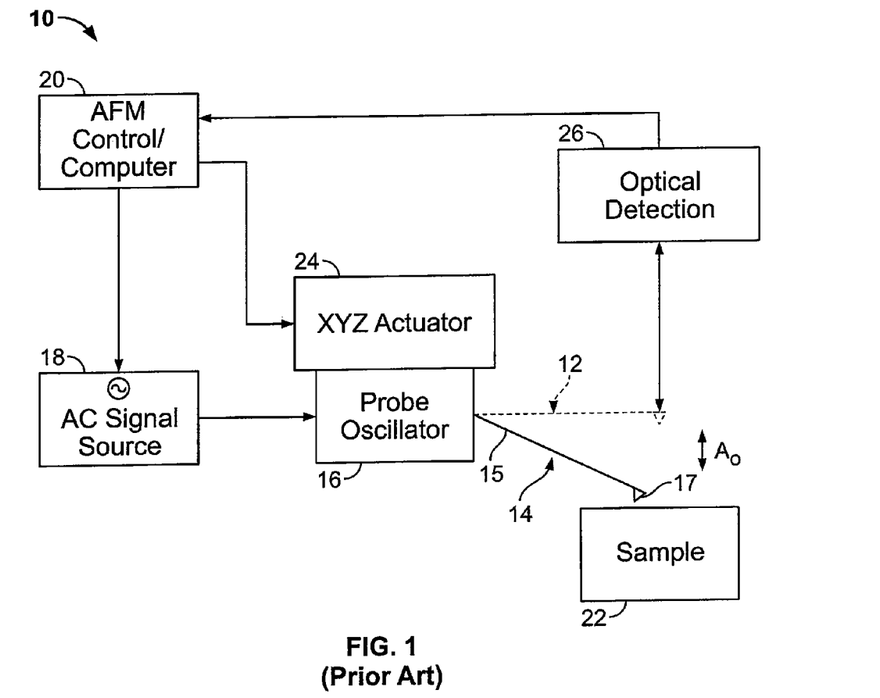
FIG. 1 is a schematic illustration of a SPM, appropriately labeled "PRIOR ART"

A typical AFM system is shown schematically in FIG. 1. An AFM 10 employing a probe device 12 including a probe 14 having a cantilever 15 is coupled to an oscillating actuator or drive 16 that is used to drive probe 14, in this case, at or near the probe's resonant frequency. Commonly, an electronic signal is applied from an AC signal source 18 under control of an AFM controller 20 to cause actuator 16 to drive the probe 14 to oscillate, preferably at a free oscillation amplitude $A_o$. Probe 14 is typically actuated toward and away from sample 22 using a suitable actuator or scanner 24 controlled via feedback by controller 20. Notably, the actuator 16 may be coupled to the scanner 24 and probe 14 but may be formed integrally with the cantilever 15 of probe 14 as part of a self-actuated cantilever/probe. Moreover, though the actuator 24 is shown coupled to the probe 14, the actuator 24 may be employed to move sample 22 in three orthogonal directions as an XYZ actuator.

For use and operation, one or more probes may be loaded into the AFM and the AFM may be equipped to select one of several loaded probes. Typically, the selected probe 14 is oscillated and brought into contact with sample 22 as sample characteristics are monitored by detecting changes in one or more characteristics of the oscillation of probe 14, as described above. In this regard, a deflection detection apparatus 17 is typically employed to direct a beam towards the backside of probe 14, the beam then being reflected towards a detector 26, such as a four quadrant photodetector. As the beam translates across detector 26, appropriate signals are transmitted to controller 20, which processes the signals to determine changes in the oscillation of probe 14. Commonly, controller 20 generates control signals to maintain a constant force between the tip and sample, typically to maintain a setpoint characteristic of the oscillation of probe 14. For example, controller 20 is often used to maintain the oscillation amplitude at a setpoint value, $A_S$, to insure a generally constant force between the tip and sample. Alternatively, a setpoint phase or frequency may be used.

As metrology applications demand greater and greater throughput, improvements to performing conventional AFM measurements, such as that described above, have become necessary. Wafer analysis in the semiconductor industry is one key application. When analyzing such structures at small scales, the corresponding measurements require uniformity control and must be able to accommodate high volume production environments. In this regard, one advancement has been in the area of automated AFMs, which greatly improves the number of samples that may be imaged in a certain time frame by, among other things, minimizing expert user tasks during operation. Instruments for performing automated wafer measurements are varied, but AFM technology offers a unique solution by providing, for example, the ability to perform high-resolution multi-dimension (e.g., 3-D) imaging.

Figure 2:
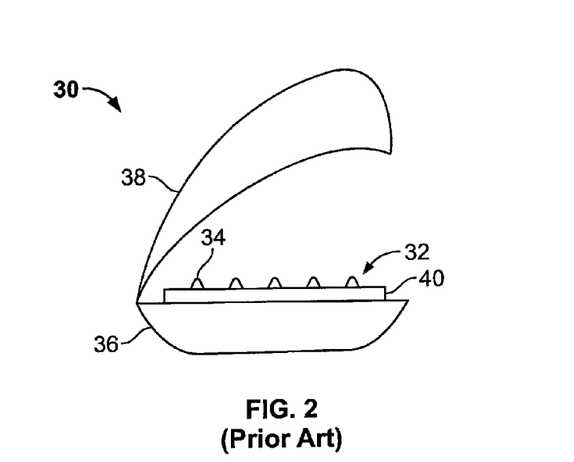
FIG. 2 is a side elevation view of a clam-shell type package for shipping probes, appropriately labeled "PRIOR ART"

Though automated AFMs provide significant performance advantages by reducing the tasks required by expert users and otherwise streamlining measurements, further improvement is desired. For instance, the manner in which some probe device manufacturers handle and ship probes can create serious challenges in efficiently delivering these often times very costly devices. According to one known delivery method, for example, probe devices for AFMs are delivered in clam-shell packs. Such a clam-shell pack or container 30 including a row 32 of probe devices 34 is shown in FIG. 2. Rows 32 of probe devices 34 are placed, preferably, "tip up" in a base 36 and are covered with a lid 38. In this case, the probe devices 34 are individually loaded into receptacles of the clam-shell pack 30, or mounted otherwise, and then shipped. To do so, the operator typically uses a tweezers to transfer the micromachined or batch fabricated probe devices from the fabrication site to the clam-shell packs. As the lid of the clam-shell pack is closed for shipping, a foam insert, or other holding mechanism, may be included in an attempt to secure the probe devices.

This operation often compromises efficient probe device delivery, for example, by risking operator error through mishandling. The probes can be dropped, scraped or otherwise subjected to unwanted forces that can damage or destroy these delicate and expensive devices. Also, with the probe devices placed in the package "tip-up," this crucial part of the device is at high risk of becoming damaged. In the end, this manner of handling and shipping probes has clearly been less than ideal.

In addition, not only do loading, shipping and handling probe devices create challenges, the manner in which probe devices are loaded into the customer's AFM, and replaced during operation, can be a challenge as well. Typically, when probe devices are to be loaded into an SPM, the expert user manually transfers the probe devices from the package in which they were delivered and places them in a probe mount of the SPM. The above-noted problems associated with such manual handling of the probe devices apply here as well, with the problems made only worse by the standard type of insert housed by the clam-shell pack that holds the devices, namely, a Gel-Pak® (Gel-Pak® is a registered trademark of Gel-Pak LLC Ltd. of Sunnyvale, Calif.). A Gel-Pak® is an ESD safe container that uses a gel insert 40 (FIG. 2) that engages and holds onto the probe devices, typically, the backs of the probe devices with the tips of the probes normally facing up, as noted previously.

Importantly, as a result, not only does the user need to manually grab the probe devices with a pair of tweezers when loading them, the user needs to turn the probes upside down to place them in the probe mount. To turn a probe device upside-down, the user must often use the tweezers to first grab, and then re-grab the probe with the opposite hand to flip it over, a time consuming process that has a high likelihood of compromising the integrity of the probes (e.g., by mishandling the probes). Alternatively, rather than using two hands, the operator may manually load probes into the AFM by setting the probes down and then picking them up again with the same hand. This procedure clearly creates a slew of other problems mostly directed to potentially damaging the probe, particularly the tip. In either case, this operation is only further complicated by the fact that the probe devices most often have a width and length that are about one millimeter by three millimeters, i.e., they are difficult to handle no matter how careful the operator is when handling the devices.

In the end, given that the probes can cost a thousand dollars each or more, an alternate method of transferring the probes was needed. Ideally, manual handling of the probe devices would be completely avoided.

Figure 3:
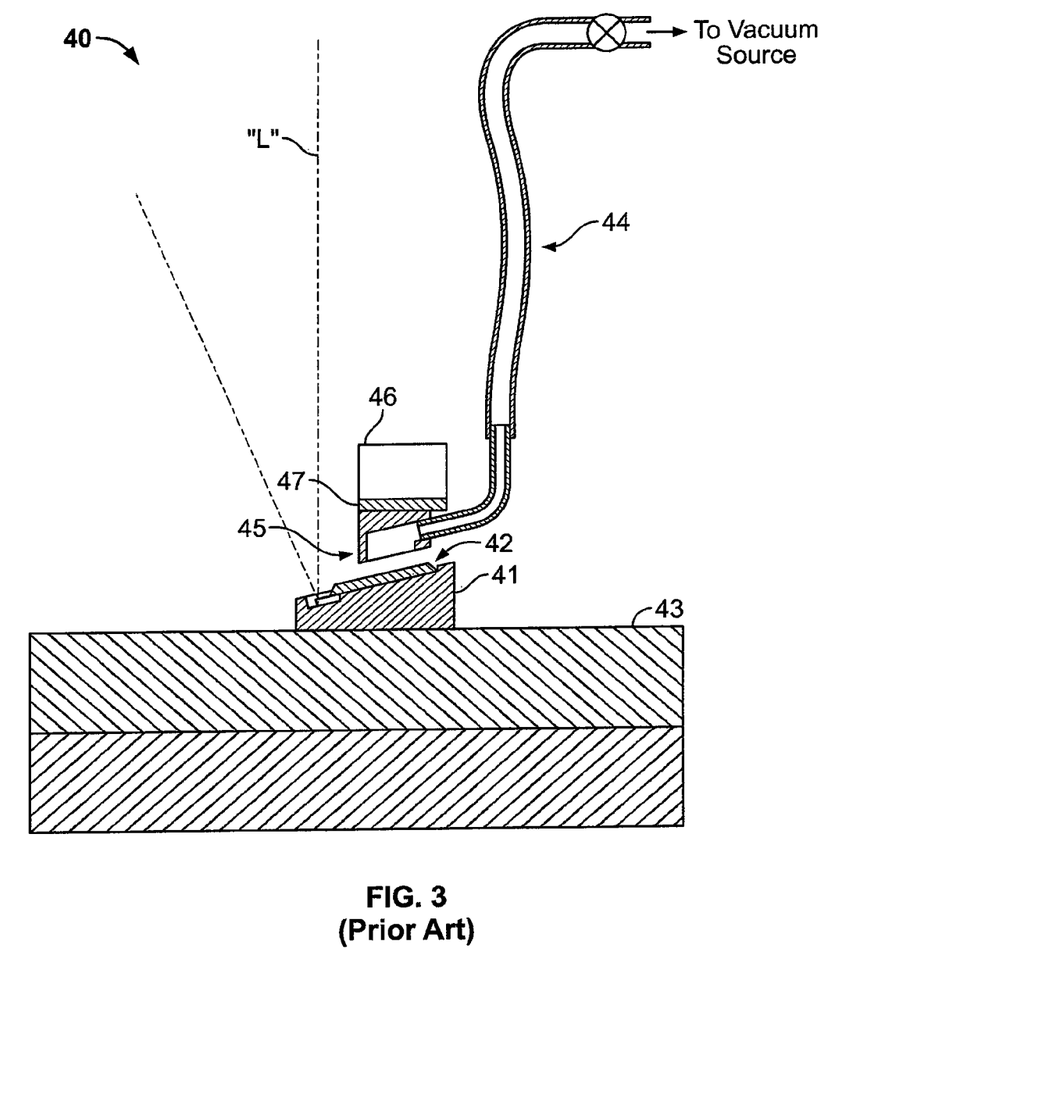
FIG. 3 is a side elevation view of an automatic probe exchange system, appropriately labeled "PRIOR ART"

In one proposed solution disclosed in U.S. Pat. No. 5,705, 814, owned by Veeco Instruments Inc., of Santa Barbara, Calif., hereby expressly incorporated by reference herein in its entirety, an automatic tip exchange system is disclosed that uses cassettes loaded with probe devices. In this system, the concept is to load cassettes with probe devices, the cassettes being mountable in an AFM. Also, with this system, the probe devices are shipped, typically, using the Gel-Paks, as described previously, with the customer loading the cassettes upon receipt. When the customer exhausts the probes of a cassette during operation, the customer loads the cassette and simply installs the loaded cassette (or loads the cassette with probe devices after mounting the cassette in the AFM) in a staging area accessible by the AFM. This is shown in the AFM 40 of FIG. 3. In this case, a probe cassette 41 holding one or more probe devices 42 is positioned on an X-Y translation stage 43. A vacuum-based probe mount 45 includes a vacuum mechanism 44 for securing probe devices to mount 45 during AFM operation. Probe mount 45 is supported by a scanner 46 via an oscillator 47 that may be used to oscillate the selected probe device 42 mounted thereto. Scanner 46 is typically a piezoelectric tube-type scanner, or a piezoelectric flexure-based scanner. In operation, probe mount 45 can be manipulated to select a probe device 42 and position the selected probe device for measuring a sample (not shown). Importantly, using this system, the user can continue to make AFM measurements without manually replacing individual probe devices 42 each time the operator wishes to use a new probe device, i.e., each new probe device being selected from probe cassette 41 disposed on stage 43 can be automatically loaded onto probe mount 45.

In view of the above, even with this automatic select/load system, the expert operator must still manually manipulate the probe devices at the AFM site. Notably, cassettes loaded by the probe device manufacturer are not employed with this and other known systems because the probe devices too often do not remain housed in the package, particularly when the AFM operator removes the lid. For example, some probes will typically stick to the lid of the package. Some AFM users therefore have found it more cost-effective to engage in the laborious and inefficient task of unloading the conventional shipping package (e.g., a Gel-Pak) manually.

Another problem with this and other known delivery and probe loading arrangements has been that the probe devices loaded in the packages can move within the package, especially if jarred, e.g., after being dropped. This clearly increases the risk that the probes might be destroyed or otherwise have their performance altered. In the end, all of these challenges with known probe device delivery and loading arrangements create significant problems with respect to compromising the yield of fully operational probes.

With further reference to one of these challenges, namely probe devices sticking to the lid or other surrounding surfaces, such sticking is often due to the use of a plastic cover when shipping the probe devices. Such plastic covers create significant static charge that attracts probe device (electrostatic discharge-ESD) causing the probe devices to stick thereto. As a result, ESD safe containers are preferred, most often including a conducting metal holder that prevents the probe devices from sticking to the lid. However, such metal holders are not immune from probe devices sticking thereto. Moreover, the use of such metal holders has the additional disadvantage that they oftentimes are unable to absorb significant impact forces, for instance, due to dropping of the package. Again, considering that probe devices can cost a thousand dollars or more, known probe delivery and loading arrangements have been found to be non-ideal.

As a result, the field of scanning probe microscopy, such as automated AFM operation (e.g., for use in the semiconductor industry), was in need of a system and method able to readily exchange probe devices from a package in which they were shipped to the AFM, while also improving yield of usable probes. In particular, a method and apparatus for delivering and replacing probe devices was needed in which the probe devices are maintained in a secure package able to absorb impact yet not damage the probe devices, while also insuring that the probe devices do not stick to any part of the package once the user receives the probe devices and wishes to introduce them to the AFM.

SUMMARY OF THE INVENTION

The preferred embodiments overcome the above-noted drawbacks of known systems by providing a probe device delivery package including a probe cassette in which an array of probe devices is retained in a base of the cassette using one or more probe retainers that impart a compressive retaining force on the probe devices stored therein. The probe retainer is preferably conductive, and thus ESD safe, and is otherwise non-stick. In one embodiment, the compliant element that provides the compressive force is the probe retainer itself, while in another the compliant element is separate from the probe retainer. Importantly, the probe devices can be loaded in the AFM with no manual manipulation by the AFM operator.

According to a first aspect of the preferred embodiment, a probe cassette for a scanning probe microscope (SPM) includes a base having at least one probe storage receptacle and a lid mountable on the base so as to at least substantially cover the at least one receptacle. The lid preferably includes a probe retainer that retains a probe device in the receptacle under a compressive force.

In another aspect of this embodiment, the compressive force is generated by deforming the probe retainer.

In a further aspect of this embodiment, the compressive force is generated by deforming a compliant element that is at least one of a group including a spring, a shock absorber, a gasket and a spring washer.

According to another aspect of this embodiment, the probe retainer is the compliant element mounted on the lid independent of the probe retainer.

In a still further aspect of this embodiment, the probe retainer includes a surface that contacts the probe device when the lid is coupled to the base and does not contact the probe device upon lid removal.

According to a further aspect of this embodiment, the surface of the probe retainer is non-stick and has a surface energy less than about 23 ergs/cm$^2$, and more preferably about 20 ergs/cm$^2$.

In another aspect of this embodiment, the surface of the probe retainer is conductive and the surface is formed using a polymer that is preferably carbon impregnated PTFE.

In a further aspect of this embodiment, the base is directly mountable in the SPM such that the probe device can be automatically loaded onto a probe mount of the SPM using one of a group including vacuum, mechanical clamp, electromagnetic force, electrostatic force and an adhesive.

According to another preferred embodiment, a probe device delivery apparatus includes a probe cassette in which at least one probe device is retained therein under a compressive force.

According to another aspect of this embodiment, a probe retainer that has a non-stick surface that contacts the probe device provides the compressive force.

According to yet another preferred embodiment, a method includes retaining a probe device of a scanning probe microscope in a receptacle of a probe cassette by applying a compressive force against the probe device.

In another aspect of this embodiment, a probe retainer having non-stick surface that contacts the probe device under the compressive force is provided. The compressive force may be provided by the probe retainer. In addition, the probe device preferably includes a surface made from carbon impregnated PTFE.

According to another preferred embodiment, a method includes shipping a probe cassette pre-loaded with at least one probe device to a user of an SPM such that the probe device is automatically loadable in the SPM from the probe cassette.

According to a further aspect of this embodiment, the probe cassette includes a base having at least one probe storage receptacle and a lid mountable on the base. The lid at least substantially covers the at least one receptacle. Moreover, a probe retainer retains a probe device placed in the receptacle under a compressive force.

In a further aspect of this embodiment, the compressive force is generated by deforming the probe retainer which includes a surface that contacts the probe device when the lid is in place and does not contact the probe device upon lid removal, and wherein the surface of probe retainer has a low surface energy, i.e., is non-stick.

According to yet another preferred embodiment, a method includes loading a probe device into a base of a probe cassette and then applying a compressive force to the probe device to retain the probe device in the base. A user releases the compressive force either before or after mounting the base in a scanning probe microscope (SPM). Once the compressive force is released, the lid can be removed and the probe devices can be automatically loaded onto a probe mount of the SPM.

According to a further aspect of this embodiment, the probe retainer is non-stick and conductive.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 4:
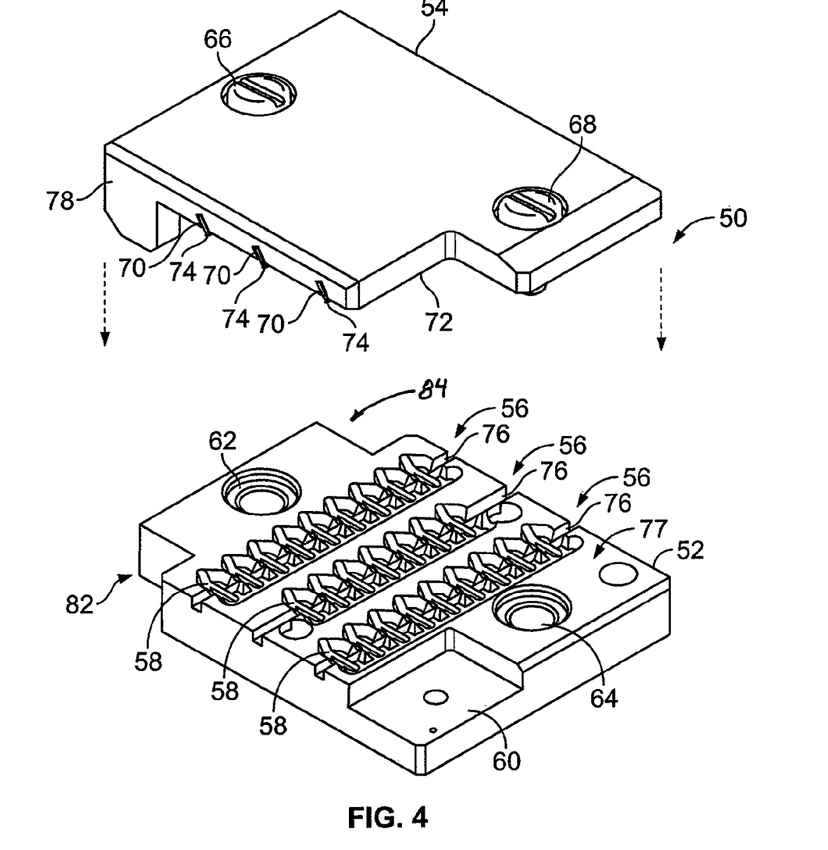
FIG. 4 is a perspective view of a probe cassette of a preferred embodiment of this invention.

Turning initially to FIG. 4, a probe cassette 50 according to a preferred embodiment includes a base 52 and a lid 54 that retains one or more probe devices (not shown). The probe devices are placed in base 52 by the probe device manufacturer for ready transport and loading into an AFM (see FIGS. 1 and 3, for example). Base 52, in this case, includes several rows 56 of probe device receptacles or pockets 58 designed to accommodate probe devices of one or more types. The probe devices have a base or substrate from which a cantilever extends, the cantilever supporting a tip extending generally orthogonally thereto near its distal end. Again, because individual probe devices can cost as much as a thousand dollars or more, it is important that the performance of the probe devices not be compromised in any way, paying particular attention to maintaining the integrity of the tips. This includes from the time of manufacture to ultimate loading in an AFM. Notably, in this regard, probe receptacles 58 are configured to accommodate the tip of the probe device and minimize the chance that the tip is interfered with in any way, including during transport. (See FIG. 9 and description below)

Importantly, by using the probe cassette 50 of FIG. 4, probe devices can be pre-loaded and delivered to a customer site with minimal AFM operator intervention. More particularly, the probe devices can be loaded anywhere by someone other than the customer (e.g., the manufacturer may pre-load cassette 50) and then the pre-loaded cassette can be shipped to the customer (e.g., forwarded to the customer by the manufacturer via any delivery channel) for future use. Once received by the customer, the cassette 50, or at least some part thereof, is directly mountable in the AFM. During AFM operation, the probe devices can then be automatically accessed by the AFM.

In this case, "directly mountable" or "automatically loadable" means that no additional manual steps are required beyond interfacing cassette 50 with the AFM, i.e., no manual manipulation of the individual probe devices is required by the operator. More particularly, once the probe cassette 50 is delivered, the AFM operator need only remove the lid 54 of probe cassette 50, thereby releasing the compressive force on the probe devices, and then place base 52 of cassette in a mounting position on the AFM, such as on stage 43 of FIG. 3. Alternatively, of course, the probe cassette 50 could be introduced to the AFM upon receipt of the cassette 50 and then the compressive force (provided at least in part by the lid 54, discussed further below) could then be released and the lid removed. In either case, manual manipulation of the probe devices themselves is minimized, thereby overcoming the drawbacks of prior mechanisms that require operator manipulation of the probe devices and which, therefore, yield an unacceptably low percentage of fully operational probe devices. Notably, the mounting position may or may not be pre-determined but once a location is chosen, locating pins (not shown) of a tip exchange pedestal that is appropriately mounted on a stage of the AFM are used to allow base 52 to be registered therewith. In particular, a series of openings 106 (see FIG. 10) are preferably formed in base 52 to secure and otherwise position the base in the AFM.

Figure 5:
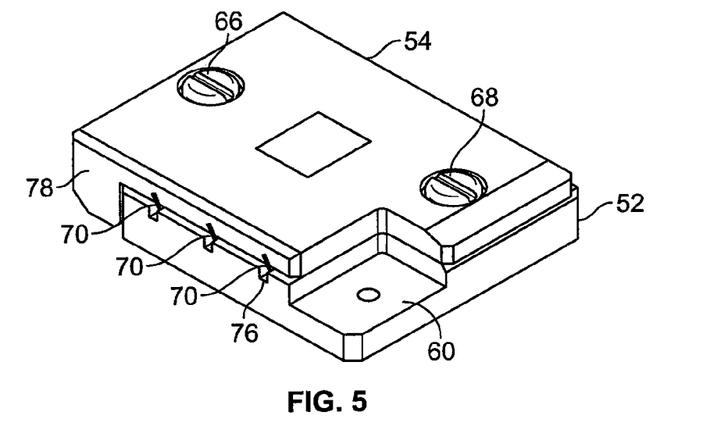
FIG. 5 is an assembled view of the probe cassette of FIG. 4.

Referring to FIGS. 4 and 5, probe cassette 50 according to the preferred embodiment includes three rows 56 of probe receptacles 58 in which probe devices (not shown in FIG. 4) are loaded tip-down. Probe receptacles 58 may be tailored to accommodate the probe devices and preferably are positioned closely adjacent to one another to accommodate as many probe devices as possible. Base 52 also includes a notch 60 primarily for facilitating handling of the base 52 by the user but could also be used for indexing when introducing probe cassette 50 to a scanning probe microscope (SPM). In addition, base 52 includes two threaded openings 62, 64 to accept connecting apparatus, for example screws 66, 68, coupled to lid 54 of package 50 for securing the probe devices between base 52 and lid 54, as shown in FIG. 5.

FIG. 5 illustrates probe cassette 50 having base 52 loaded with probe devices and having lid 54 mounted on base 52, fully assembled with screws 66, 68 appropriately tightened. The loaded probe cassette 50 is thus ready for delivery and is able to withstand jarring, including being dropped. Notably, once the AFM operator wishes to use the probes contained within probe cassette 50, the operator need only loosen screws 66, 68, remove lid 54 and register base 52 with the AFM, for example, on a stage such as that shown in FIG. 3. At that point, the AFM is able to selectively access probe devices, for example, in response to operator commands. In this regard, a selected probe device may be loaded onto an AFM probe mount using any one of a group of suitable retrieving/retaining apparatus. Such apparatus include, but are not limited to, vacuum, mechanical clamp, electromagnetic force, electrostatic force and an adhesive.

Figure 6:
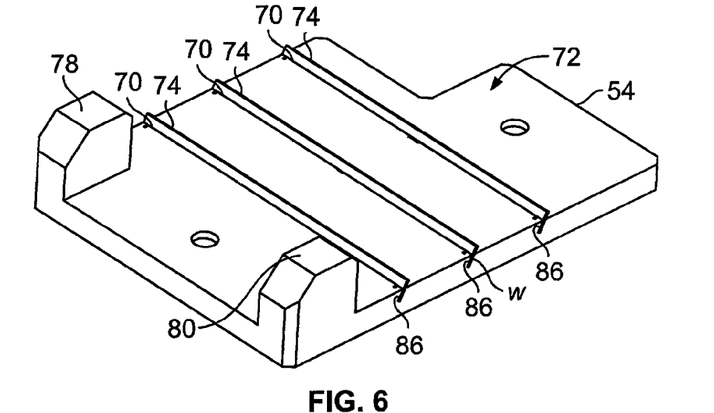
FIG. 6 is a perspective view of an underside of a lid of the probe cassette of FIG. 4.

Referring to FIGS. 4 and 6-8, to retain the probe devices disposed in probe receptacles 58 of base 52 of cassette 50, lid 54 includes a series of probe retainers or strips 70, preferably corresponding to the number of rows 56, that interface with the probe devices placed in receptacles 58. As shown in FIGS. 4 and 6, retainers 70 are disposed on an underside 72 of lid 54, extending away therefrom. In this way, when lid 54 is placed on base 52 filled with probe devices, a distal edge 74 of strips 70 can impinge upon the base or substrate of the probe devices, thereby holding the probe devices in receptacles 58 between base 52 and lid 54. Notably, to accommodate probe retainers 70 along rows 56 but outside of probe receptacles 58 when lid 54 is placed on top of base 52 (with probe devices sandwiched therebetween), channels or grooves 76 are formed on a top surface 77 of base 52 as seen in FIG. 4. Channels 76 are preferably formed along the rows 56 of probe receptacles 58 generally orthogonally to the longitudinal axis of the probe devices.

In general, probe retainers 70 operate to hold the probe devices within cassette 50 under a compressive force, i.e., the probe retainers touch the probe devices when the lid 54 is mounted on the base 52. As described in further detail below, the compressive force may be generated using compliant retainers 70 as they sandwich the probe devices between base 52 and lid 54, or if rigid retainers are used, the compressive force may be provided by one or more appropriately configured connectors for securing lid 54 to base 52 (see FIGS. 11A and 11B and the corresponding description below).

Figure 7:
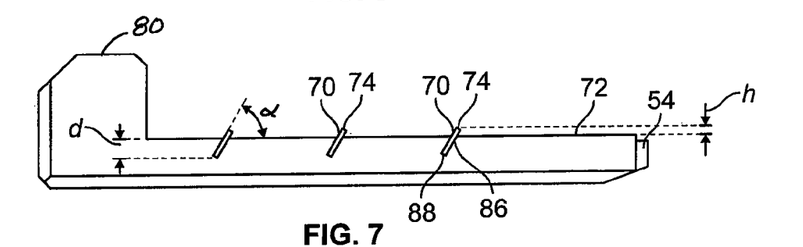
FIG. 7 is a side elevation view of the lid of FIG. 6.

With more particular reference to FIG. 6, probe retainers 70 are mounted on underside 72 of lid 54, preferably in slots 86 formed on underside 72. To achieve the desired retaining characteristics, slots 86 ideally are formed at a selected angle, α, as shown in FIG. 7. This way, probe retainers 70 correspondingly extend from underside 72 of lid 54 substantially at that angle. As a result, retainers 70 exert a configurable force on the probe devices to achieve the goals of the preferred embodiments. This is shown in more detail with more particular reference to FIGS. 6-8.

Figure 8:
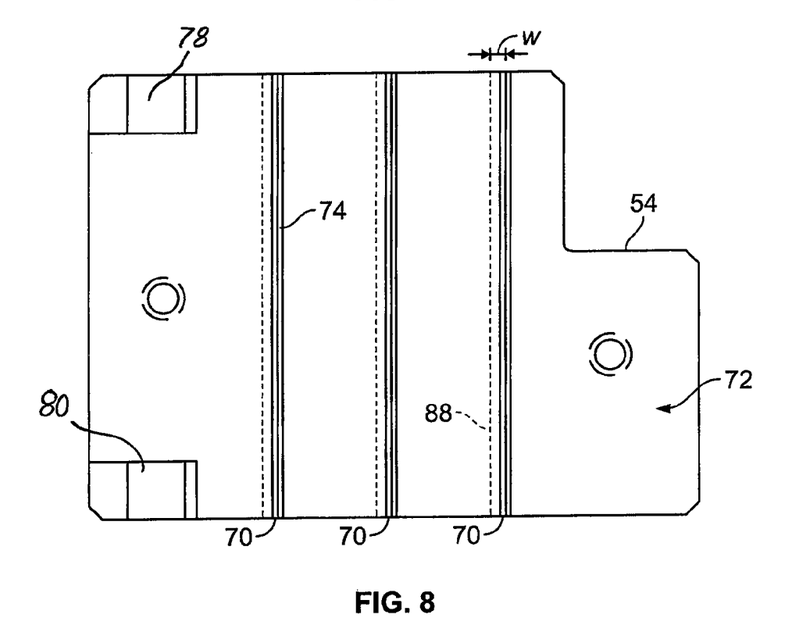
FIG. 8 is a bottom view of the lid of FIG. 6.

FIGS. 6-8 illustrate how probe retainers 70 are designed and mounted. Retainers 70 preferably extend within slots 86 and abut at or near a bottom 88 of slots 86. To determine the ideal shape of the probe retainer 70 and the corresponding mounting arrangement, including the angle, $\alpha$, at which retainers 70 extend from inside surface 72 of lid 54, particular attention is paid to the effective height, "h", of retainers 70, as shown in FIG. 7. The effective height "h" of retainers 70 is primarily determined by the depth "d" of slots 86 and the width "w" of retainers 70. (FIGS. 7 and 8) The goal in selecting these dimensions is to provide retainers 70 that impose a compressive force on probe devices sufficient to hold the probe devices, yet not so large to either deform or damage the probe devices in any way, including creating particles (e.g., by scraping the probe devices) that could attach to the probe devices and cause future operational problems. In addition, the compressive force imposed on the probe devices should not cause the probe devices to stick to retainers 70, or any part of lid 54, upon removal of lid 54 from cassette 50. On whole, the selected effective height "h" and angle, $\alpha$, is designed to accommodate dropping cassette 50 from a significant height, such as shoulder height, with sufficient yield of fully operational probes. In this regard, the achievable yield of fully operational probe devices using the preferred embodiments is at least 90%, and more preferably is maintained at or above 95%.

With respect to the ideal angle, $\alpha$, given the type of retainer 70 employed, as much compression force as possible is desired without damaging the type of probe devices being housed therein. For example, for probe devices with solid silicon substrates, more force can be applied than when probe devices having components or circuitry mounted on the substrate are packaged. That said, even for less complex probe devices, the applied force should not be so great as to scrape the substrate and create free-flowing particles within the cassette. Preferably, the angle $\alpha$ is between about 30 degrees and 60 degrees, and more preferably about 45 degrees. Notably, at an extreme, if the angle is 90 degrees, the only compliance provided by retainers 70 is by the retainer material itself, i.e., there is no bending compliance. Because bending compliance is more readily controlled and robust, retainers 70 preferably have significant bending compliance. In the end, forty-five degrees is preferred to provide sufficient force, yet allow material and effective height flexibility. The corresponding cut depth "d" of slots 86 and width "w" of retainers 70 should be appropriately formed, for example, empirically by doing iterations of tests including dropping the cassette 50 from varying heights. When ideal cut depth of slots 86 and width of retainers 70 has been determined, the tolerances on those dimensions are preferably about $\pm 5/1000$ths, and more preferably about $\pm 2/1000$ths. In a preferred embodiment, h is about 0.0299 to 0.0337 inches, w is about 0.010 inch $\pm 0.001$ inch, and d is about 0.085 inch $\pm 0.001$ inch.

Preferably, retainers 70 are held in slots 86 with an adhesive. Using an adhesive is preferred primarily because it is desired that retainers 70 not be deformed when mounted, which might occur, for example, by pinching or using separate mechanical connectors to secure retainers 70. In this regard, if the retainers 70 are deformed, the force they impart on the probe devices may be non-uniform along the length of retainers 70. As a result, some probe devices may not be held at all by retainers 70, while others may be subject to forces greater than desired which may, in turn, compromise the performance of those probes. Overall, by using an adhesive it is easier to achieve a continuous retainer height "h" away from inside surface 72 of lid 54 along strip 70. As a result, the desired retaining forces are more readily maintained, thus adding to the robust nature of the design. Notably, also, by using an adhesive, retainers 70 can be easily replaced when necessary (e.g., due to wear) as long as a removable adhesive is employed.

In sum, to achieve the goals of the package, cassette 50 preferably includes an appropriate compliant mechanism. In addition, probe retainers 70 should be sufficiently non-stick to prevent the probe devices from sticking to them. With respect to the compliant nature of the holding mechanism of cassette 50, as suggested previously, the compliance may be provided by probe retainers 70 themselves, or by using a combination of rigid probe retainers 70 and compliant, shock-like connectors between lid 54 and base 52 (see FIGS. 11A and 11B, discussed below). With respect to the strips 70 themselves, they, or at least the surface thereof that contacts the probe devices, are preferably fabricated using a non-stick material that is conductive (e.g., surface resistivity of strips 70 is preferably less than about 1 Kohm), and thus ESD safe. In this regard, carbon impregnated PTFE is ideal. As an alternative to carbon impregnated PTFE, different types of conducting plastics may be used.

In another alternative, probe retainers 70 could be, rather than elongate strips, individual brushes or other discrete protrusions that interface with the probe devices individually. However, such an arrangement is not preferred given wear issues and the fabrication difficulty associated with mounting and replacing individual brushes.

Notably, one of the key advantages of using a compliant strip made of, for example, carbon impregnated PTFE, is that strip 70 is designed to contact and hold the probe devices at multiple points along each row in contrast to a typical kinematic retainer. More particularly, by using compliant strips, the preferred embodiments are able to impinge each probe device along a row of probe devices, in contrast to retainers with little or no compliance, which typically would only contact the probe devices that extend the highest within the probe device receptacles. Because the preferred embodiments are able to secure each and every probe device within the cassette, the present probe device cassette minimizes the chance that one or more of the probe devices becomes damaged or is otherwise compromised, for example, due to chipping of the silicon.

With further reference to the compliance of retainer 70, the material should be relatively soft, and in any event, less than the hardness of silicon, a Mohs hardness of about 6.5. The preferred compliance should be maintained over both the length of probe retainer 70 as well as its width, thus defining a spring used to hold the probes within probe receptacles 58. Regarding the non-stick nature of probe retainers 70, the material should maintain a low surface energy, preferably within a range of less than about 50 ergs/cm$^2$, and more particularly, less than about 20-23 ergs/cm$^2$.

As noted previously, AFM probe devices are typically micromachined or batch fabricated according to known techniques. In this case, after inspection and testing, the manufacturer places the probe devices in the base 52 of probe cassette 50 for delivery to the customer. Once the probe devices are loaded into base 52, the cover or lid 54 is placed on top of base 52, as shown in FIG. 5, such that the probe retainers 70 mounted on underside 72 of lid 54 can impart a retaining force on at least a portion of the probe devices. To facilitate proper alignment with the base, lid 54 has legs 78, 80 that are accommodated by notches 82, 84, respectively, in base 54 to properly register lid 54 with base 52. (See FIGS. 5 and 6)

Once base 52 is loaded with probe devices, and lid 54 is placed thereon, screws 66, 68 of lid 54 are brought into engagement with corresponding threaded openings 62, 64 of base 52 and then appropriately tightened to clamp the probe devices between lid 54 and base 52, and more particularly, between probe retainers 70 and the bottom surfaces of probe receptacles 58. In this case, probe retainers 70 are formed with some compliance so that the force applied to the probe devices is strong enough to hold the probe devices in place, yet not so great to compromise the integrity thereof, even under stress. Again, the composition of the probe retainers and the placing of probe retainers or strips 70 at an angle as described above facilitates this objective.

Figure 9:
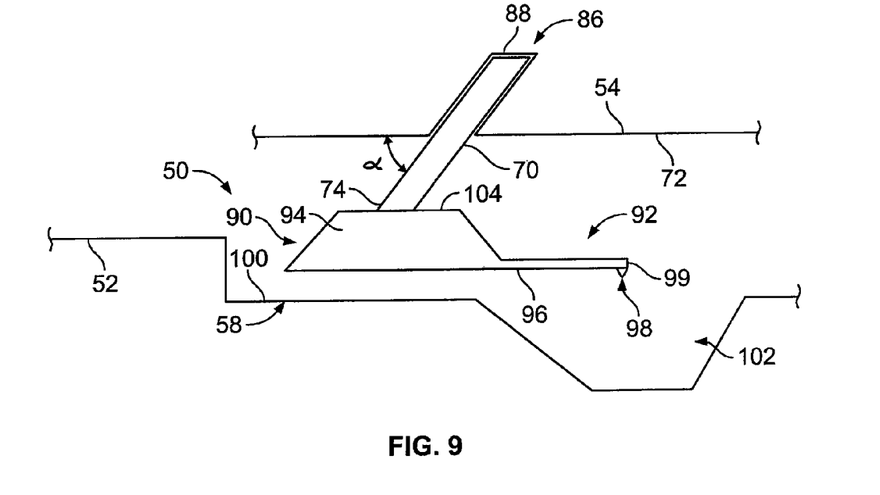
FIG. 9 is a schematic side view of a probe retainer mounted in the lid of FIG. 6 as its distal end contacts a substrate of a probe device placed in the cassette.

A schematic illustration of a probe device 90 loaded in base 52 and clamped in place by lid 54 including a probe retainer 70 is shown in FIG. 9. Probe device 90 includes a probe 92 and a base or substrate 94 including a bottom surface 96 that ultimately is placed adjacent a bottom surface 100 of a probe receptacle 58, such as that shown in FIG. 4. Notably, a tip 98 of probe device 90 supported by a cantilever 99 of probe 92 is accommodated by an opening 102 of probe receptacle 54 so that tip 98 does not contact any portion of probe receptacle 58, even if cassette 50 is jarred. The probe manufacturer moves lid 54 having probe retainers 70 mounted (e.g., glued) in a corresponding slot 86 of underside 72 of lid 54 towards the base 52 so that a distal end 74 of a retainer 70 contacts a top surface 104 of substrate 94 of probe device 90. As lid 54 is clamped into place by tightening screws 66, 68 (FIG. 4), the compliant probe retainer 70 may move slightly along top surface 104 of substrate 94 to hold substrate 94 against bottom surface 100 of probe receptacle 58 with precision force, yet without damaging probe device 90. Again, the force applied by retainer 70 on substrate 94 of probe device 90 is sufficiently strong to withstand jostling during delivery or even a four or five foot drop of probe cassette 50 onto a hard surface without compromising probe device performance.

Figure 10:
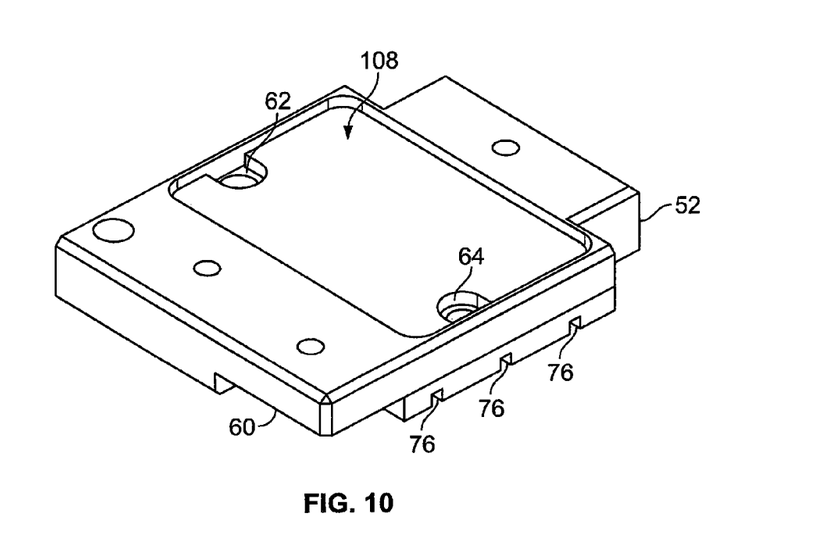
FIG. 10 is a bottom view of the base of the probe cassette of FIG. 4.

Turning to FIG. 10, the bottom of base 52 is shown. Base 52 includes openings 62, 64 to receive the screws of lid 54 (FIG. 4) when tightening lid 54 to base 52 of probe cassette 50, thus securing the probe devices as described previously. A recessed opening 108 is provided on the bottom of base 52 to accommodate, for example, a product identifier (not shown).

Figure 11A:
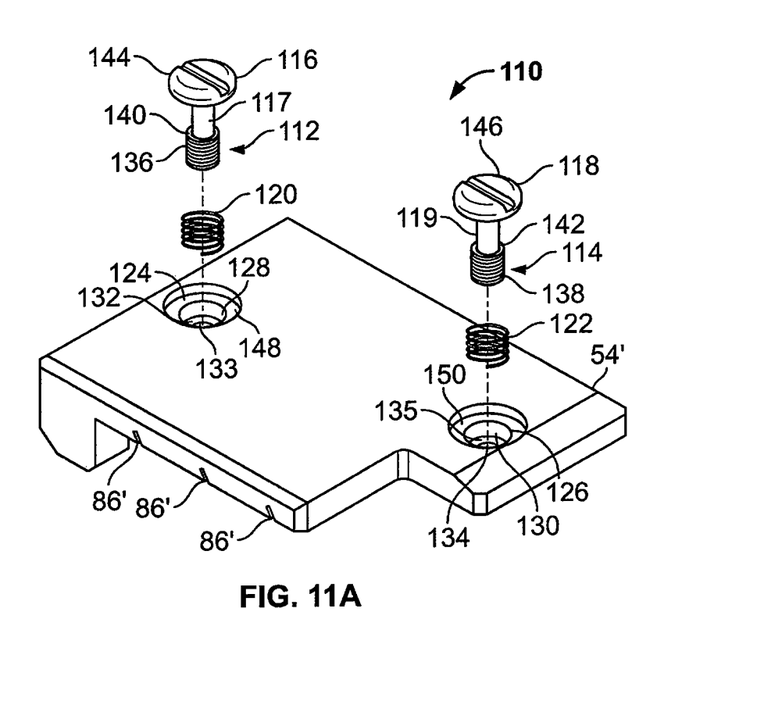
FIG. 11A is a perspective top view of a lid of a cassette of an alternate embodiment of the invention.
Figure 11B:
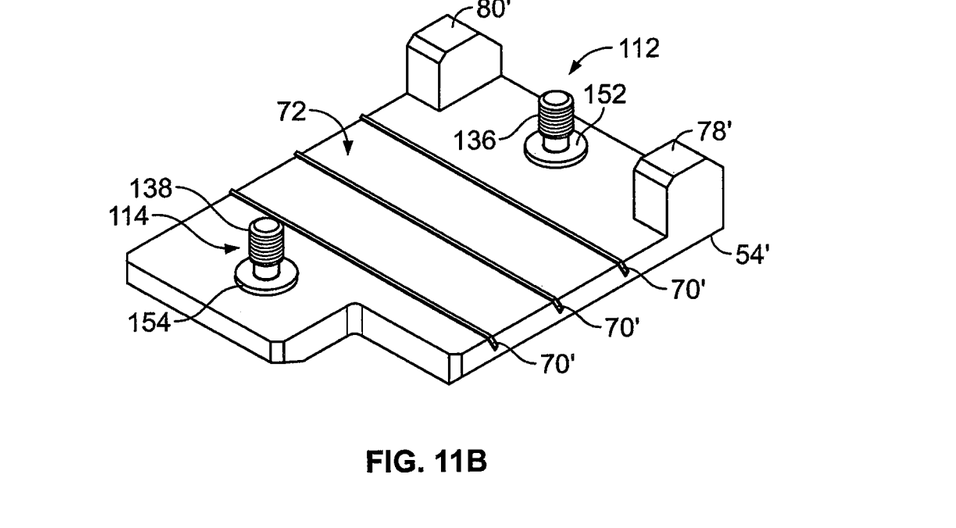
FIG. 11B is a bottom view of the lid of FIG. 11A.

In an alternative, reference is made to FIGS. 11A and 11B. In this case, the probe retainers are not necessarily manufactured using carbon impregnated PTFE, or other material with similar compliance characteristics. The compliance instead is provided by spring loaded attachment devices mounted on probe cassette. In particular, openings 124, 126 formed in a lid 54' are provided to accommodate corresponding spring loaded attachment devices 112, 114 that, when coupled to a base (such as base 52 of cassette 50), provide the requisite compliance to insure that probe retainers 70' contact the substrate of the probe devices with sufficient force to maintain the probe devices in receptacles 58 of base 52 (FIG. 4), even during jarring, yet not with a force so great that the probes break or their performance is otherwise compromised.

Preferably, spring loaded attachment devices 112, 114 include respective captive screws 116, 118, and corresponding springs 120, 122, such as coil springs. Springs 120, 122 are introduced to openings 124, 126 of lid 54' such that they are seated in cylindrical sections 128, 130 of openings 124, 126. Cylindrical sections 128, 130 include a support surface 132, 134 upon which springs 120, 122 introduced to cylindrical sections 128, 130 rest. Support surfaces 132, 134 of cylindrical sections 128, 130 also include a central opening 133, 135 that is threaded to receive captive screws 116, 118.

To assemble the spring loaded attachment devices 112, 114, springs 120, 122 are introduced to cylindrical sections 128, 130 where they rest on surface 132, 134 of the cylindrical sections. A threaded end 136, 138 of each of captive screws 116, 118 is placed axially through springs 120, 122 and engaged with threaded openings 133, 135 of openings 124, 126. Once the ends 136, 138 are fully threaded entirely through openings 133, 135, a respective retaining washer 152, 155 is coupled to the shaft 117, 119 of captive screw 116, 118, as shown in FIG. 11B. In this way, captive screws 116, 118 are floating on springs 120, 122 in the undercut portions of openings 124, 126. More particularly, heads 144, 146 of captive screws 116, 118 float on springs 120, 122 and can be pushed towards undercut surfaces 148, 150 of openings 124, 126 against springs 120, 122. When coupling lid 54' to a base, threaded ends 136, 138 of captive screws 116, 118 are coupled to corresponding threaded openings of the base, such as openings 62, 64 of base 52 of FIG. 4. As screws 116, 118 are tightened to the base, the base is pulled towards the lid 54' with springs 120, 122 being compressed between surfaces 133, 135 and the undersurfaces of heads 144, 146 of screws 116, 118. This arrangement provides the compliant element and the corresponding compliant force. Screws 116, 118 are further tightened until probe retainers 70' contact the probe devices stored in the base. Further tightening of the screws 116, 118 is dictated by the amount of force applied by probe retainer 70' required to retain the probe devices without compromising their operability. The degree to which the spring loaded attachment devices 112, 114 are tightened is preferably determined for the particular type of probe being delivered, and may be determined empirically. Notably, the spring loaded attachment devices 112, 114 shown in, FIGS. 11A and 11B illustrate one arrangement for providing a compliant element that applies a compressive force to probe devices housed in the cassette 110. Alternative arrangements for providing a controllable compressive force are contemplated as being within the skill of those in the art.

In this case, probe retainers 70' can be made of any non-stick and conductive rigid material such as steel, or a more compliant material such as the carbon impregnated PTFE described above. That said, similar to cassette 50, retainers 70' of cassette 110 are still preferably mounted in lid 54' having slots 86' that are angled which operates to minimize the chance that retainers 70' damage the probe devices in any way. And, similar to the above, retainers 70' are preferably glued in slots 86' and may be replaced by using a removable adhesive.

Although the best mode contemplated by the inventors of carrying out the present invention is disclosed above, practice of the present invention is not limited thereto. For example, a variety of non-stick and/or compliant materials could be used as probe retainers and other types of compliant elements may be provided to realize the objectives of the preferred embodiments, including providing a package that minimizes AFM operator handling of the probe devices yet maintains high probe yield. For example, the compliant element could be in the base, the lid, or a combination of both. It could be at least one of a group including a spring, a shock absorber, a gasket and a spring washer. It will be manifest that various additions, modifications and rearrangements of the features of the present invention may be made without deviating from the spirit and scope of the underlying inventive concept.

What is claimed is:

1. A method of operating a scanning probe microscope (SPM), the method comprising the steps of:

providing a delivery package including a base and a lid;
loading the base of the delivery package into the SPM;
operating the SPM to scan a sample with at least one probe device initially supported by the delivery package without manual manipulation of the probe device by a user from the delivery package of the scanning probe microscope;
wherein the base includes at least one probe storage receptacle and the lid of the delivery package is mounted to the base so as to at least substantially cover the at least one receptacle, and wherein the at least one probe device includes a plurality of probe devices, and wherein a probe retainer retains at least one of the probe devices under compressive force; and
wherein the compressive force is generated by deforming at least one of at least a portion of the lid and the probe retainer.

2. The method of claim 1, further comprising the step of removing the lid from the base of the delivery package.

3. The method of claim 1, wherein no further manual action is taken with respect to the loading of the base into the SPM.

4. The method of claim 1, wherein the step of loading the base further comprises registering the base with the SPM.

5. The method of claim 4, wherein the base is registered with a stage of the SPM.

6. The method of claim 1, wherein the compressive force is generated by deforming a compliant element.

7. The method of claim 6, wherein the compliant element is mounted on the lid independent of the probe retainer.

8. The method of claim 6, wherein the compliant element is a spring.

9. The method of claim 1, wherein the probe retainer is compliant so as to generate the compressive force.

10. The method of claim 9, wherein the probe retainer includes a surface that contacts the probe device when the lid is coupled to the base and does not contact the probe device upon lid removal.

11. The method of claim 10, wherein at least the surface of the probe retainer that contacts the probe device is non-stick.

12. The method of claim 11, wherein the probe retainer has a surface energy less than about 30 ergs/cm$^2$.

13. The method of claim 11, wherein the surface of the probe retainer is conductive and formed using a polymer.

14. The method of claim 13, wherein the polymer is carbon impregnated PTFE.

15. A method of operating a scanning probe microscope (SPM), the method comprising the steps of
providing a delivery package including:
a base having at least one probe storage receptacle;
a lid mountable on the base so as to at least substantially cover the at least one receptacle;
a probe retainer that retains at least one of the SPM probe devices in the receptacle under a compressive force; and
wherein the compressive force is generated by deforming at least one of a) at least a portion of the lid and b) the probe retainer;
loading the base into the SPM; and
operating the SPM to scan a sample with at least one probe device initially supported by the delivery package without manual manipulation of the probe device by a user from the delivery package.

* * * * *